United States Patent
Rommel et al.

(10) Patent No.: US 11,715,574 B2
(45) Date of Patent: Aug. 1, 2023

(54) SYSTEM AND METHODS FOR MITIGATING EFFECTS OF RADIATION ON COMPOSITE STRUCTURES

(71) Applicant: Eagle Technology, LLC, Melbourne, FL (US)

(72) Inventors: Monica Lee Rommel, Savage, MN (US); Janice S. Brooks, Victor, NY (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 248 days.

(21) Appl. No.: 17/342,049

(22) Filed: Jun. 8, 2021

(65) Prior Publication Data

US 2022/0392658 A1 Dec. 8, 2022

(51) Int. Cl.
*G21F 1/08* (2006.01)
*G02B 1/14* (2015.01)
*G02B 23/02* (2006.01)
*G21F 3/00* (2006.01)

(52) U.S. Cl.
CPC ............... *G21F 1/08* (2013.01); *G02B 1/14* (2015.01); *G02B 23/02* (2013.01); *G21F 3/00* (2013.01)

(58) Field of Classification Search
CPC .... G21F 1/08; G21F 3/00; G02B 1/14; G02B 23/02
USPC ......... 250/505.1, 506.1, 507.1, 515.1, 516.1, 250/517.1, 518.1, 519.1
See application file for complete search history.

(56) References Cited

U.S. PATENT DOCUMENTS

| | | | |
|---|---|---|---|
| 4,388,344 A * | 6/1983 | Shuskus | G02B 5/08 427/166 |
| 4,504,109 A | 3/1985 | Taga et al. | |
| 5,275,861 A | 1/1994 | Vaughn | |
| 7,351,479 B2 | 4/2008 | Funkenbusch et al. | |
| 8,221,654 B2 | 7/2012 | Kim et al. | |
| 9,093,184 B2 | 7/2015 | Bennington et al. | |
| 2007/0056769 A1 | 3/2007 | Severance et al. | |
| 2008/0151254 A1* | 6/2008 | Sanders | G02B 6/024 385/127 |

(Continued)

FOREIGN PATENT DOCUMENTS

| | | |
|---|---|---|
| CZ | 2014335 A3 | 11/2015 |
| EP | 2761047 A1 | 8/2014 |
| WO | 2013074134 A1 | 5/2013 |

OTHER PUBLICATIONS

Romeo, Robert & Martin, Robert. (2007). Unique space telescope concepts using CFRP composite thin-shelled mirrors and structures—art. no. 66870U Proc SPIE. 28-. 10.1117/12.734648.

(Continued)

*Primary Examiner* — Nicole M Ippolito
(74) *Attorney, Agent, or Firm* — Fox Rothschild LLP (57) ABSTRACT

Systems (100) and methods (600) for providing a product with a radiation mitigation feature. The methods comprise: obtaining a composite base layer formed of a fiber-reinforced material; and performing a deposition process to dispose a first coating layer on the composite base layer so as to form the product with a radiation barrier, the first coating layer comprising 35% by mass or less of a metal constituent, at least 65% by mass of a germanium constituent, a zero or substantially zero coating stress, and/or an overall thickness between 2 microns and 8 microns.

20 Claims, 6 Drawing Sheets

(56) References Cited

U.S. PATENT DOCUMENTS

2012/0038981 A1 2/2012 Dopilka et al.
2016/0178808 A1 6/2016 Tolgay

OTHER PUBLICATIONS

European Search Report issued in European Application No. 22165864 dated Sep. 13, 2022.

* cited by examiner

SYSTEM AND METHODS FOR MITIGATING EFFECTS OF RADIATION ON COMPOSITE STRUCTURES

FIELD

This document relates generally to composite structures. More particularly, this document relates to systems and methods for mitigating effects of radiation on composite structures.

BACKGROUND

Composite structures are used for many applications in environments with relatively high radiation levels, such as a space environment that has radiation levels of 50-2000 mSV.

The Total Ionizing (TID) is deposited on the surface of the composite structures in varying amounts depending on altitude and mission life. The high TID dose exposure may cause degradation and/or deformation of the composite structure.

SUMMARY

The present disclosure concerns implementing systems and methods for providing a product with a radiation mitigation feature. The methods comprise: obtaining a composite base layer formed of a fiber-reinforced material; performing a deposition process to dispose a first coating layer on the composite base layer so as to form the product with a radiation barrier; and/or disposing a second coating layer that is reflective on the first coating layer. The first coating layer comprises 35% by weight or mass or less of a metal constituent, at least 65% by weight or mass of a germanium constituent, a substantially zero coating stress, and an overall thickness between 2 microns and 8 microns.

In some scenarios, the product comprises a mirror and the second coating layer facilitates a reception of light and a reflection of the light. The first coating layer may: have no impact or substantially no impact on at least one of a reflectivity performance and a coating stress of the second coating layer; and/or provides protection to the composite base layer in environments with a radiation level of 50-2000 mSV.

In those or other scenarios, the first coating layer comprises at least one sub-layer of co-deposited germanium and metal. Alternatively, the first coating layer comprises a plurality of alternating germanium sub-layers and metal sub-layers. Each of the plurality of alternating germanium sub-layers and metal sub-layers may have a thickness between 2 microns and 8 microns. A thickness of each germanium sub-layer may be greater than a thickness of each metal sub-layer. A ratio of the germanium constituent to the metal constituent may be selected to provide a resulting smooth surface of the product.

The present document also concerns an article of manufacture. The article of manufacture comprises: a composite base layer formed of a fiber-reinforced material; a first coating layer disposed on the composite base layer to form a radiation barrier; and/or a second coating layer that is reflective and disposed on the first coating layer. The first coating layer comprises 35% by mass or less of a metal constituent, at least 65% by mass of a germanium constituent, a zero or substantially zero coating stress, and an overall thickness between 2 microns and 8 microns.

In some scenarios, the article of manufacture comprises a mirror. The second coating layer facilitates a reception of light and a reflection of the light into a focused beam. The first coating layer may have no impact or substantially no impact on at least one of a reflectivity performance and a coating stress of the second coating layer. The first coating layer may provide protection to the composite base layer in environments with a radiation level of 50-2000 mSV.

In those or other scenarios, the first coating layer comprises at least one sub-layer of co-deposited germanium and metal. Alternatively or additionally, the first coating layers comprise a plurality of alternating germanium sub-layers and metal sub-layers. Each of the plurality of alternating germanium sub-layers and metal sub-layers may have a thickness between 2 microns and 8 microns. A thickness of each germanium sub-layer may be greater than a thickness of each metal sub-layer. A ratio of the germanium constituent to the metal constituent may be selected to provide a resulting smooth exterior surface of the article of manufacture.

DESCRIPTION OF THE DRAWINGS

Embodiments will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, composite structures are used for many applications in environments with relatively high radiation levels, such as a space environment that has radiation levels of 50-2000 mSV. The TID dose is defined in terms of electron and proton radiation. The TID is deposited on the surface of the composite structures in varying amounts depending on altitude and mission life. The high TID dose exposure may cause degradation and/or deformation of the composite structures. The present solution provides a way to reduce the effects of the TID dose exposure and to extend the lives of the composite structures. More specifically, the present solution provides a radiation barrier coating that does not affect any other coating's performance while offering improved radiation stability in certain environments (e.g., space environments or other environments with high radiation levels). The radiation barrier coating can mitigate the effects of the TID dose exposure on the surfaces of the composite structures. The radiation barrier coating may be applied as the only coating to a composite structure, or may be used in conjunction with other types of coatings (e.g., a high reflectance coating) so as to provide a resulting structure with improved protection for the relatively high radiation environments.

The present solution can be used in various applications. Such applications include, but are not limited to, space telescope applications, microwave oven applications, and/or x-ray equipment applications. The present solution will be described below in relation to telescope applications simply for ease of discussion. The present solution is not limited in this regard.

Figure 1:
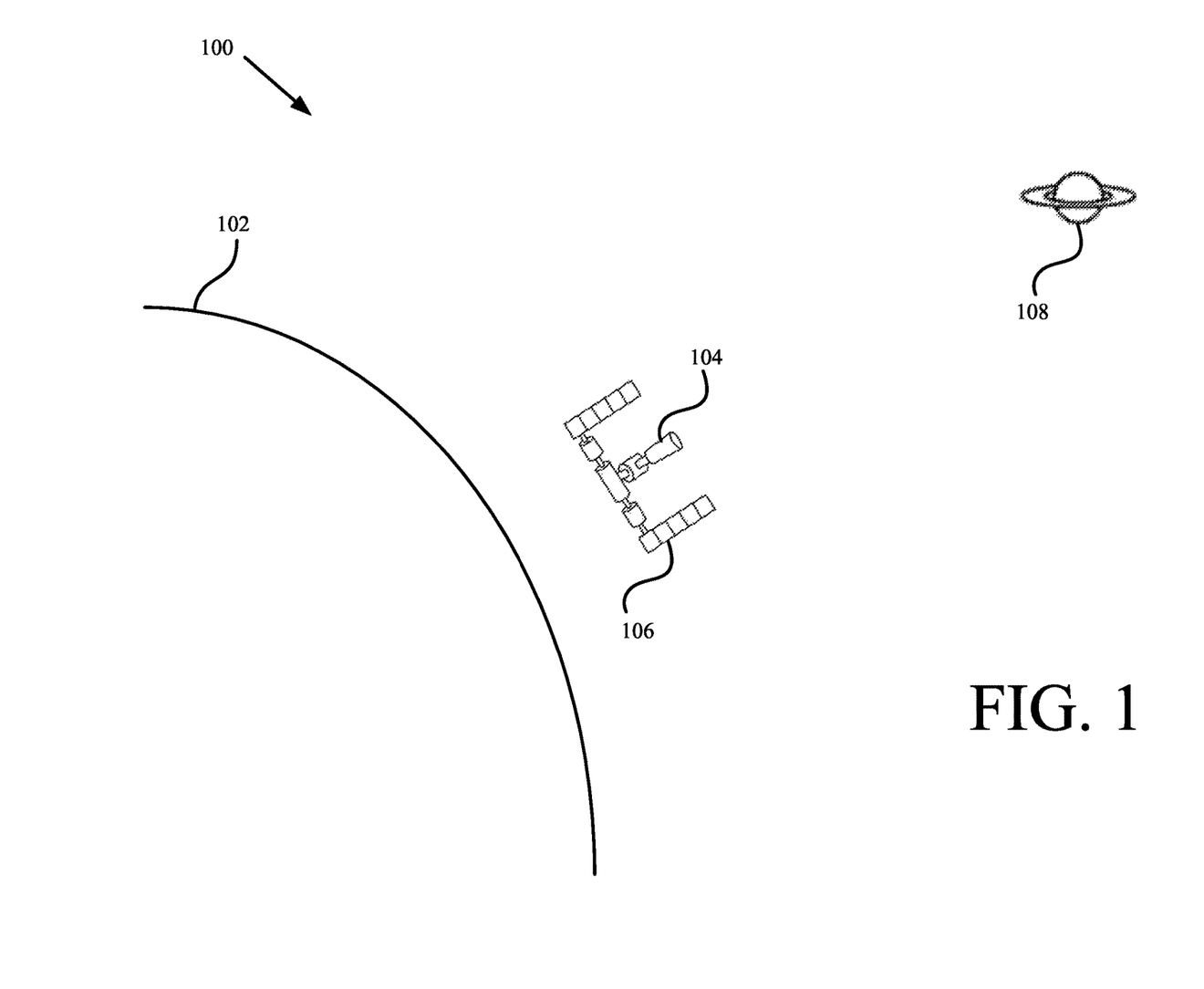
FIG. 1 provides an illustration of an illustrative space telescope system.

Referring now to FIG. 1, there is provided an illustration of an illustrative space telescope system 100. The space telescope system 100 is configured to collect information about at least one remote target 104. In this regard, the space telescope system 100 comprises a telescope 104 coupled to and structurally supported by a support platform 106. The support platform 106 is in orbit around the earth 102. The support platform 106 can include, but is not limited to, a space station or a satellite. A more detailed diagram of the telescope 104 is provided in FIG. 2.

Figure 2:
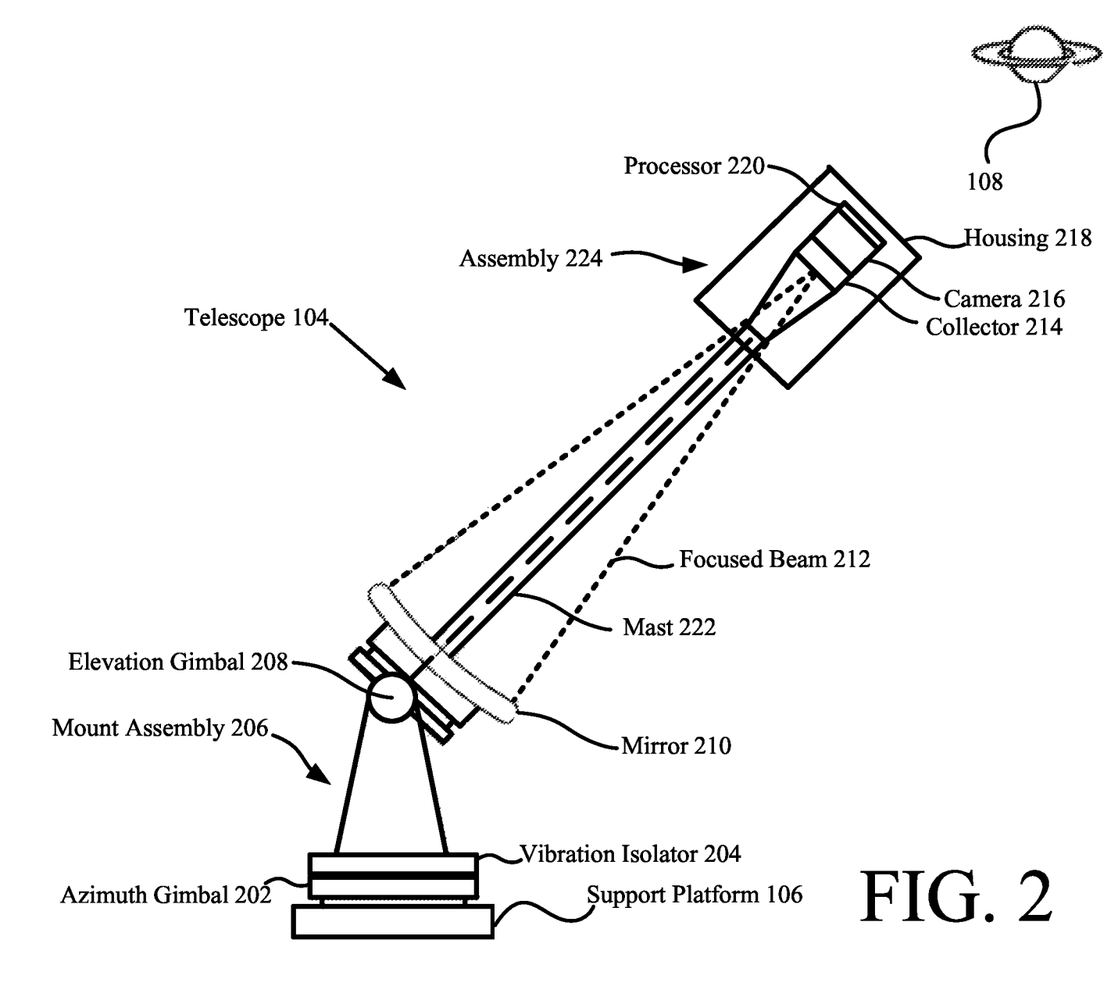
FIG. 2 provides an illustration of an illustrative telescope.

Referring now to FIG. 2, the telescope 104 comprises a mount assembly 206 for securely mounting the telescope 104 to the support platform 106. The mount assembly 206 can include, but is not limited to, a weld, bolts, screws, and/or an adhesive. The mount assembly 206 also comprises an azimuth gimbal 202 and an elevation gimbal 208. The two gimbals 202, 208 permit both azimuth and elevation adjustments of a mirror 210. The mirror 210 comprises a substantially parabolic reflector. The present solution is not limited in this regard. The mirror 210 can have other shapes such as a hyperbolic shape or a spherical shape. The mirror 210 is oriented in FIG. 2 to receive light originating from the remote target 108 and to reflect light in a focused beam 212 to collector 214. The mirror 210 can be slewed to remain trained on the remote target 108 as the support platform 106 orbits around earth 102 using the gimbals 202, 208.

A mast 222 extends from an approximate center of the mirror 210. A proximal end of the mast 222 is coupled directly to the mirror 210 or indirectly to the mirror via the mount assembly 206. The mast 222 is configured to extend substantially perpendicular from the mirror 210, and to maintain the perpendicular relationship with the mirror 210 as the mirror slews. An assembly 224 is structurally supported on a distal end of the mast 222. The collector 214 is housed within a housing 218 of the assembly 224. Other equipment resides in the housing 218 that is necessary for receiving and processing the information collected by the mirror 210. Such other equipment includes, but is not limited to, a processor 220 and/or a camera 216. Processors and cameras are well known in the art, and therefore will not be described herein.

Figure 3:
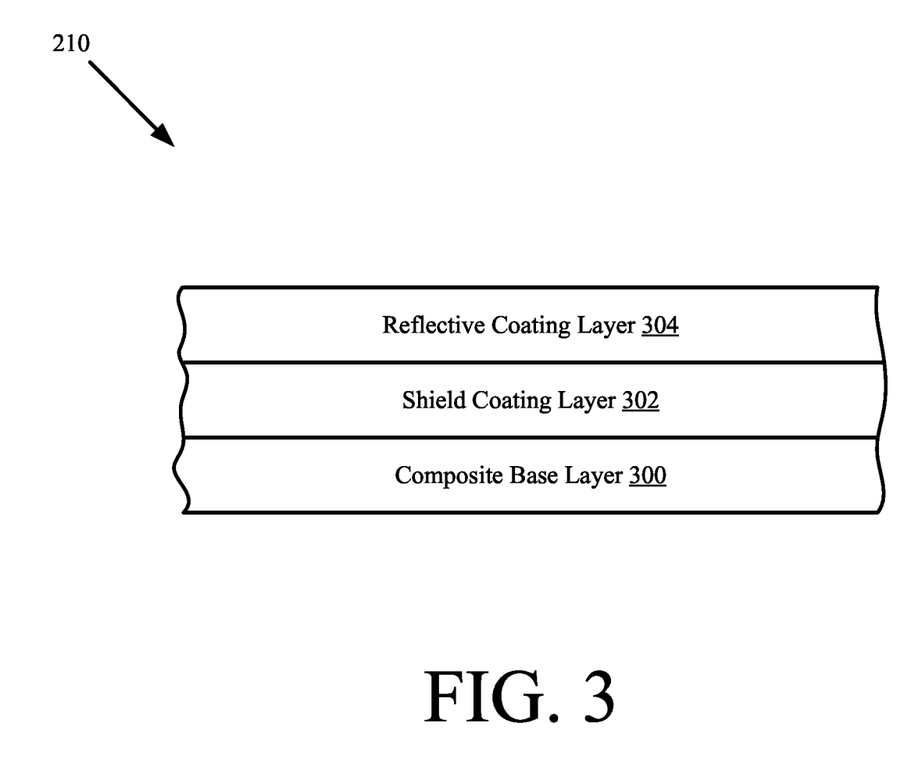
FIG. 3 provides a cross-sectional view of a mirror shown in FIG. 2.

A cross-sectional view of the mirror 210 is provided in FIG. 3. Mirror 210 has a novel overall structure since the present solution is implemented therein. The manner in which the present solution is implemented in mirror 210 will become evident as the discussion progresses.

As shown in FIG. 3, mirror 210 has a composite base layer 300 on which two different coating layers 302, 304 are disposed. The composite base layer 300 may be formed of a fiber-reinforced plastic made of a polymer matrix reinforced with fibers. The fibers can include, but are not limited to, glass fibers, carbon fibers, aramid fibers and/or basalt fibers. The polymer can include, but is not limited to, an epoxy, a vinyl ester, or a polyester thermosetting plastic.

Each of the coating layers 302, 304 can be applied in accordance with an electron beam deposition process or other spray coating process. Electron beam deposition and spray coating processes are well known in the art, and therefore will not be described here. Any known or to be known electron beam deposition or spray coating process can be used here to dispose the coating layers 302, 304 on the composite base layer 300.

The reflective coating layer 304 is formed of a reflective material so that the mirror 210 can receive light and reflect light in a focused beam 212 to collector 214. Reflective materials are well known in the art, and therefore will not be described here. Any known or to be known reflective material can be used here without limitation. For example, reflective coating layer 304 is formed of silver. The reflective coating layer 304 does offer protection to the composite base layer 300 from exposure to relatively low radiation doses (e.g., radiation levels between 0-10 mSV). However, the reflective coating layer 304 is inadequate to provide protection to the composite base layer 300 from degradation and/or deformation in environments with higher radiation levels (e.g., radiation levels between 10-2000 mSv or 50-2000 mSv). Accordingly, the novel radiation barrier or shield coating layer 302 is provided to address this feature of the reflective coating layer 304. The shield coating layer 302 resides between the composite base layer 300 and the reflective coating layer 304. The shield coating layer 302 provides significant degradation/damage protection for the composite base layer 300 in relatively high radiation environments (such as a space environment), while maintaining performance of the reflective coating layer 304 (e.g., reflectivity, coating stress, and/or adhesion). The particulars of the shield coating layer 302 will now be discussed in detail.

Figure 4:
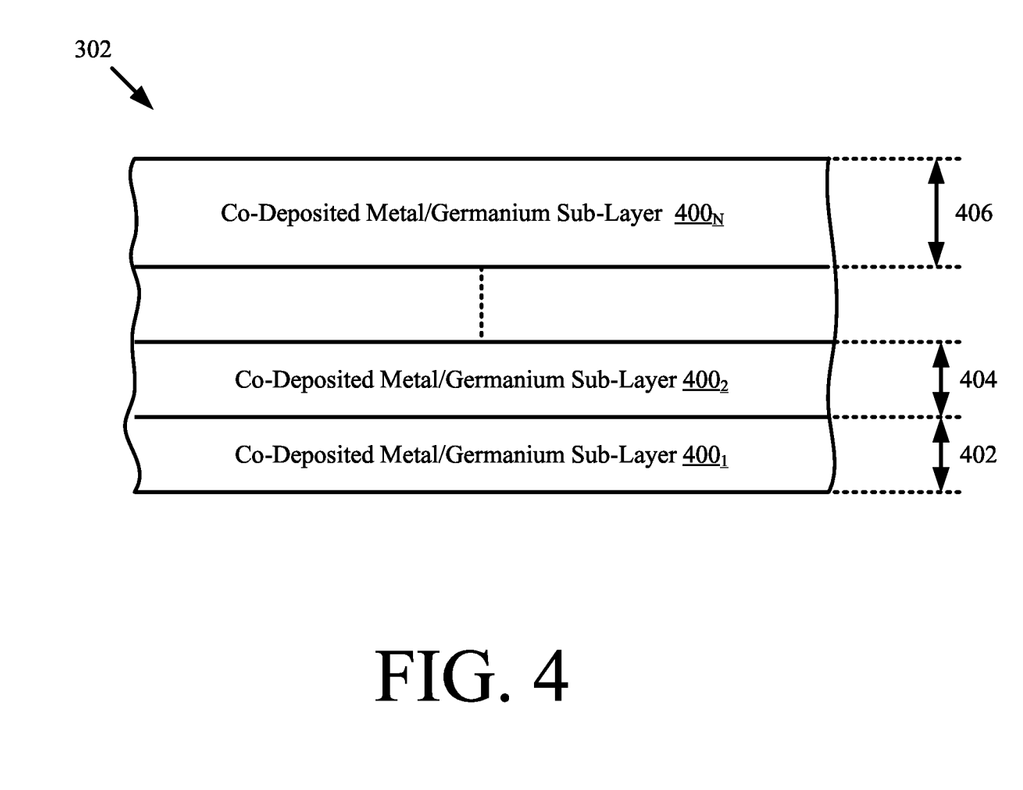
FIG. 4 provides an illustration that is useful for understanding an illustrative architecture for a shield coating layer shown in FIG. 3.

In some scenarios, the shield coating layer 302 comprises one or more sub-layers of co-deposited germanium and metal (e.g., silver). An illustration showing such a shield coating 302 is provided in FIG. 4. In FIG. 4, the shield coating 302 comprises N co-deposited sub-layers $400_1$, $400_2$, ..., $400_N$ of a metal constituent and a germanium constituent. N is an integer equal to or greater than one. The shield coating 302 is formed so that there is a total of at least 65% by weight or mass of the germanium constituent with the remainder 0-35% comprising the metal constituent (e.g., silver) therein. It should be noted that one or more of the sub-layers can include the same amount of germanium and the same amount of metal, or alternatively different amounts of the germanium constituent and different amounts of the metal constituent.

In some scenarios, the shield coating layer 302 is formed so that there is a total of 80%-95% germanium and 5-20% metal therein. The germanium constituent can include, but is not limited to, germanium having a CAS number 7440-56-4 which is available from Fisher Scientific™ of Massachusetts. The metal constituent can include, but is not limited to, silver having a CAS number 7440-22-4 which is available from Fisher Scientific™ of Massachusetts. The present solution is not limited to the particulars of these scenarios. The ratio of germanium to silver is selected so that the resulting reflective surface of the mirror 210 has no roughness or a relatively low amount of roughness, i.e., so that the mirror has a smooth or substantially smooth exterior surface.

The ratio of germanium to silver is selected so that the coating compressive stress and/or the coating tension stress of the shield coating layer 302 is(are) zero (or neutral) or substantially zero (e.g., less than 5). In this regard, it should be understood that the metal sub-layer(s) cause(s) a positive stress and the germanium sub-layer(s) cause(s) a negative stress. Since the positive stress caused by the metal is greater than the negative stress caused by the same amount of germanium, the shield coating layer 302 is designed to include a larger amount of germanium than metal so that the coating compressive and/or tension stresses thereof is(are) optimized (e.g., zero or substantially zero). The optimized coating compressive and/or tension stresses facilitate prevention of the cracking, slipping and/or peeling of the shield coating layer 302. In effect, the life span of the shield coating layer 302 is increased.

The sub-layers $400_1$, $400_2$, ..., $400_N$ can have the same or different thicknesses 402, 404, 406. For example, sub-layers $400_1$ and $400_2$ have the same thicknesses 502, 504 as each other, but different thicknesses than the thickness 406 of sub-layer $400_N$. Each thickness 402, 404, 406 may have a value t between 1 or 2 micron(s) and 8 microns, and/or between 1 or 2 micron(s) and 7.2 microns (i.e., 1 or 2 microns <t<8 microns, and/or 1 or 2 microns <t<7.2 microns). The present solution is not limited to the particulars of this example. Alternatively, all of the thicknesses are the same as or different than each other. The thicknesses are selected in accordance with a given application and the environment in which the underlying composite base layer 300 is to be used.

Figure 5:
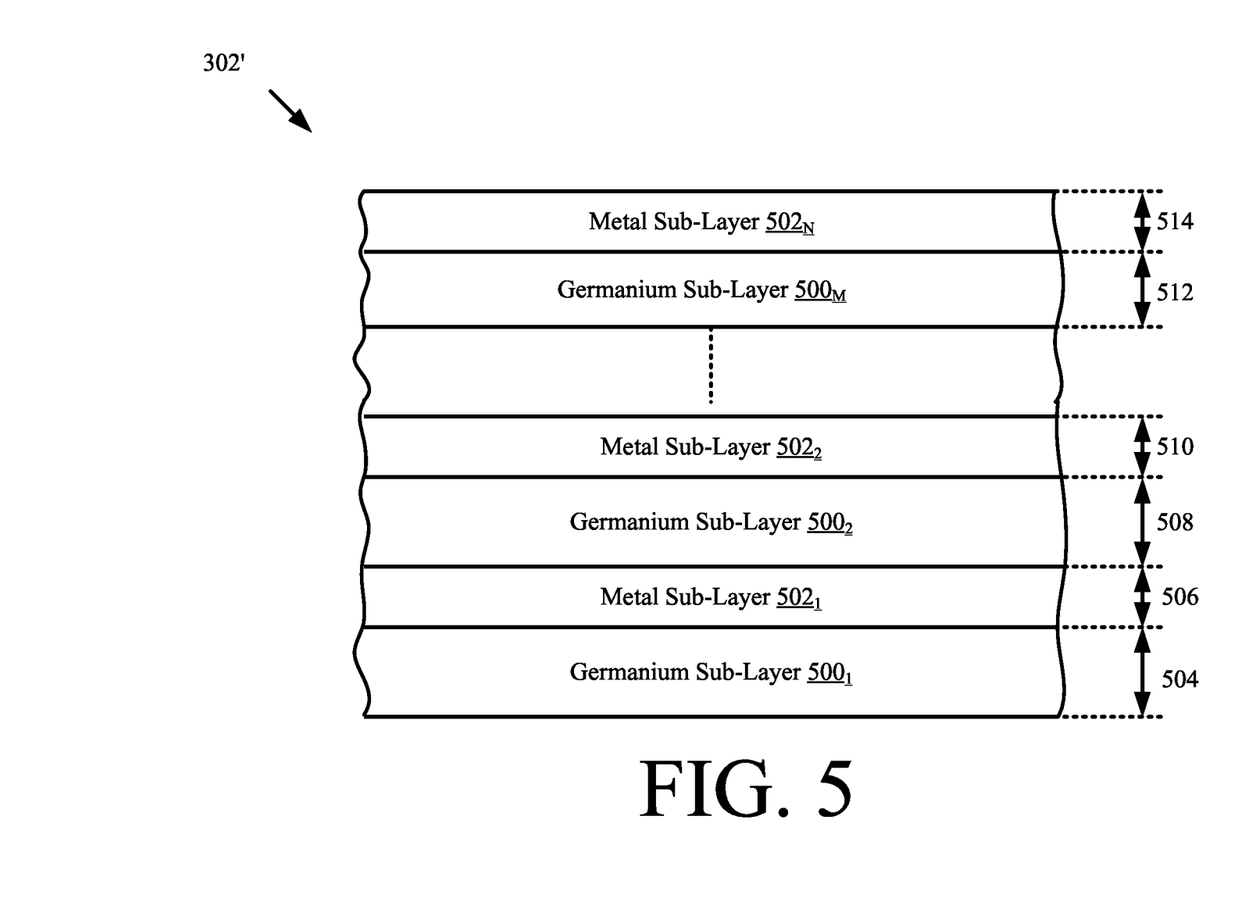
FIG. 5 provides an illustration that is useful for understanding another illustrative architecture for a shield coating layer shown in FIG. 3.

In other scenarios, the shield coating comprises alternating germanium and metal sub-layers. An illustration showing such a shield coating layer 302' is provided in FIG. 5. As shown in FIG. 5, the shield coating layer 302' comprises alternating germanium sub-layers $500_1$, $500_2$, ..., $500_M$ and metal sub-layers $502_1$, $502_2$, ..., $502_N$. Each of N and M is an integer equal to or greater than one. The values of N and M may be equal to or different than each other.

In some scenarios, the shield coating layer 302' comprises two sub-layers, namely one metal sub-layer and one germanium sub-layer. In other scenarios, the shield coating layer 302' includes at least one metal sub-layer and at least two germanium sub-layers. The present solution is not limited to the particulars of these scenarios. The shield coating layer 302' can include any number of metal sub-layers and any number of germanium layers selected in accordance with a given application. The metal sub-layer(s) may include, but is(are) not limited to, silver having a CAS number 7440-22-4 which is available from Fisher Scientific™ of Massachusetts. The germanium sub-layer(s) may include, but is(are) not limited to, germanium having a CAS number 7440-56-4 which is available from Fisher Scientific™ of Massachusetts. The germanium sub-layer(s) prevent(s) silver grain growth during the disposition process. Silver grain growth results in an increase in surface roughness of the shield coating layer 302'. Such surface roughness is not desirable in mirror applications and/or other applications in which a product with a relatively smooth reflective surface is needed.

The shield coating layer 302' is formed so that there is a total of at least 65% germanium with the remainder 0-35% comprising metal (e.g., silver) therein. It should be noted that the germanium sub-layers $500_1$, ..., $500_M$ can include the same amount or different amounts of germanium. Similarly, the metal sub-layers $502_1$, ..., $502_N$ can include the same or different amounts of metal. In some scenarios, the shield coating layer 302' is formed so that there is a total of 65%-95% germanium and 5-35% metal therein. The present solution is not limited to the particulars of these scenarios. The ratio of germanium to silver is selected so that the resulting reflective surface of the mirror 210 has no roughness or a relatively low amount of roughness.

The ratio of germanium to silver is selected so that the coating stress (e.g., coating compressive stress and/or coating tension stress) of the shield coating layer 302' is zero (or neutral) or substantially zero (e.g., less than 5). In this regard, it should be understood that the metal sub-layer(s) $502_1$, ..., $502_N$ cause(s) a positive stress and the germanium sub-layer(s) $500_1$, ..., $500_M$ cause(s) a negative stress. Since the positive stress caused by the metal is greater than the negative stress caused by the same amount of germanium, the shield coating layer 302' is designed to include a larger amount of germanium than metal so that the coating compressive and/or tension stresses thereof is(are) optimized (e.g., zero or substantially zero). The optimized coating compressive and/or tension stresses facilitate prevention of the cracking, slipping and/or peeling of the shield coating layer 302'. In effect, the life span of the shield coating layer 302' is increased.

The sub-layers $500_1$, $500_2$, ..., $500_M$, $502_1$, $502_2$, ..., $502_N$ can have the same or different thicknesses 504, 506, 508, 510, 512, 514. For example, the germanium sub-layers $500_1$, $500_2$, ..., $500_M$ have the same thicknesses 504, 508, 512 as each other, but different thicknesses than the thicknesses 506, 510, 514 of the metal sub-layers $502_1$, $502_2$, ..., $502_N$. The metal sub-layers $502_1$, $502_2$, ..., $502_N$ are shown as being the same. Each thickness 504, 506, 508, 510, 512, 514 may have a value t between 1 or 2 micron(s) and 8 microns, and/or between 1 or 2 micron(s) and 7.2 microns (i.e., 1 or 2 micron(s)<t<8 microns, and/or 1 or 2 micron(s)<t<7.2 microns). The present solution is not limited to the particulars of this example. Alternatively, all of the thicknesses are the same as or different than each other.

The thicknesses are selected in accordance with a given application and the environment in which the underlying composite base layer 300 is to be used.

Figure 6:
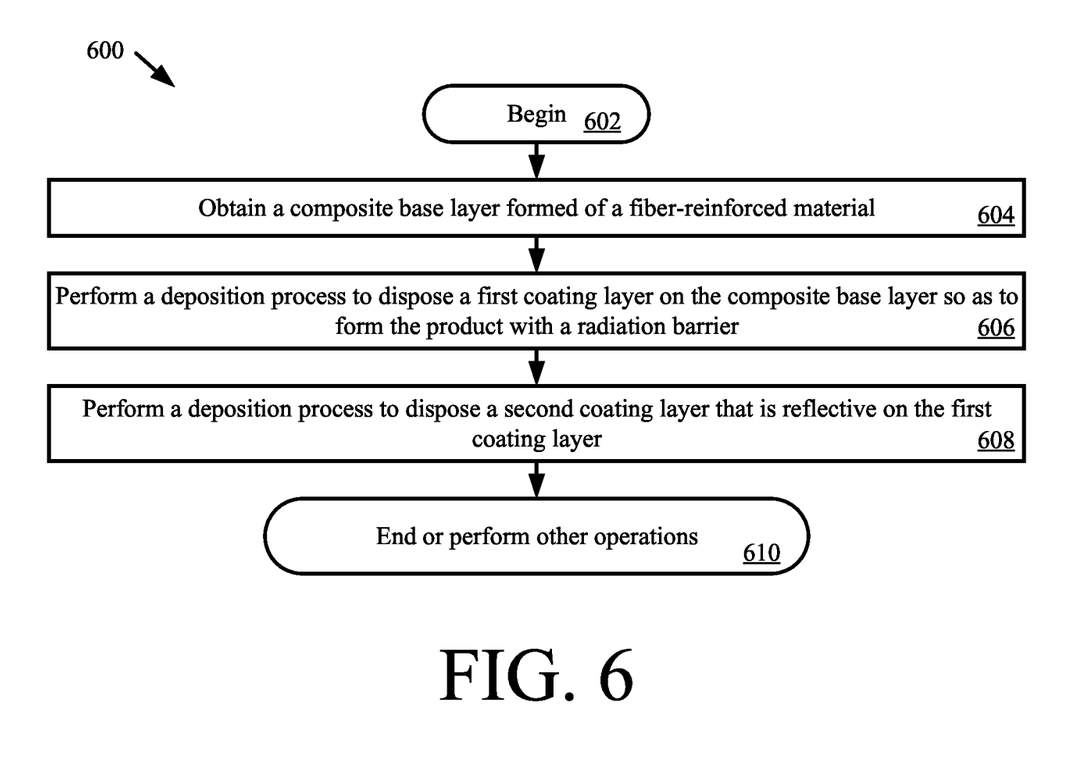
FIG. 6 provides a flow diagram of an illustration method for providing a product with a radiation mitigation feature.

Referring now to FIG. 6, there is provided a flow diagram of an illustrative method 600 for providing a product with a radiation mitigation feature. The product may include, but is not limited to, a mirror (e.g., mirror 210 of FIG. 2) or other article of manufacture.

Method 600 begins with 602 and continues with 604 where a composite base layer (e.g., composite base layer 300 of FIG. 3) is obtained. The composite base layer is formed of a fiber-reinforced material. In 604, a deposition process (e.g., an electron beam deposition process) is performed to dispose a first coating layer (e.g., shield coating layer 302 of FIG. 3) on the composite base layer so as to form the product with a radiation barrier. The first coating layer comprises 35% or less of a metal constituent, at least 65% of a germanium constituent, a zero or substantially zero coating stress, and/or an overall thickness between 2 microns and 8 microns. In 606, a deposition process (e.g., an electron beam deposition process) is performed to dispose a second coating layer (e.g., reflective coating layer 304 of FIG. 3) on the first coating layer. The second coating layer may be formed of a reflective material (e.g., silver), and/or facilitate a reception of light and a reflection of the light into a focused beam (e.g., focused beam 212 of FIG. 2). The first coating layer may: have no impact or substantially no impact on at least one of a reflectivity performance and a coating stress of the second coating layer; and/or provides protection to the composite base layer in environments with a radiation level of 50-2000 mSV.

In some scenarios, the first coating layer comprises at least one sub-layer of co-deposited germanium and metal (e.g., sub-layer(s) $400_1$, $400_2$, ..., $400_N$ of FIG. 4). In other scenarios, the first coating layers comprise a plurality of alternating germanium sub-layers (e.g., sub-layers $500_1$, $500_2$, ..., $500_M$ of FIG. 5) and metal sub-layers (e.g., sub-layers $502_1$, $502_2$, ..., $502_M$ of FIG. 5). Each of the plurality of alternating germanium sub-layers and metal sub-layers may have a thickness between 1 or 2 microns and 8 microns. A thickness of each germanium sub-layer may be greater than a thickness of each metal sub-layer. A ratio of the germanium constituent to the metal constituent may be selected to provide a resulting smooth surface.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for providing a product with a radiation mitigation feature, comprising:
   obtaining a composite base layer formed of a fiber-reinforced material; and
   performing a deposition process to dispose a first coating layer on the composite base layer so as to form the product with a radiation barrier, the first coating layer comprising 35% by mass or less of a metal constituent, at least 65% by mass of a germanium constituent, a substantially zero coating stress, and an overall thickness between 2 microns and 8 microns.

2. The method according to claim 1, further comprising disposing a second coating layer that is reflective on the first coating layer.

3. The method according to claim 2, wherein the product is a mirror and the second coating layer facilitates a reception of light and a reflection of the light.

4. The method according to claim 3, wherein the first coating layer has substantially no impact on at least one of a reflectivity performance and a coating stress of the second coating layer.

5. The method according to claim 1, wherein the first coating layer provides protection to the composite base layer in environments with a radiation level of 50-2000 mSV.

6. The method according to claim 1, wherein the first coating layer comprises at least one sub-layer of co-deposited germanium and metal.

7. The method according to claim 1, wherein the first coating layers comprise a plurality of alternating germanium sub-layers and metal sub-layers.

8. The method according to claim 7, wherein each of the plurality of alternating germanium sub-layers and metal sub-layers has a thickness between 2 microns and 8 microns.

9. The method according to claim 7, wherein a thickness of each germanium sub-layer is greater than a thickness of each metal sub-layer.

10. The method according to claim 1, wherein a ratio of the germanium constituent to the metal constituent is selected to provide a resulting smooth surface.

11. An article of manufacture, comprising:
    a composite base layer formed of a fiber-reinforced material; and
    a first coating layer disposed on the composite base layer to form a radiation barrier, the first coating layer comprising 35% by mass or less of a metal constituent, at least 65% by mass of a germanium constituent, a substantially zero coating stress, and an overall thickness between 2 microns and 8 microns.

12. The article of manufacture according to claim 11, further comprising a second coating layer that is reflective and disposed on the first coating layer.

13. The article of manufacture according to claim 12, wherein the article of manufacture comprises a mirror and the second coating layer facilitates a reception of light and a reflection of the light.

14. The article of manufacture according to claim 13, wherein the first coating layer has substantially no impact on at least one of a reflectivity performance and a coating stress of the second coating layer.

15. The article of manufacture according to claim 11, wherein the first coating layer provides protection to the composite base layer in environments with a radiation level of 50-2000 mSV.

16. The article of manufacture according to claim 11, wherein the first coating layer comprises at least one sub-layer of co-deposited germanium and metal.

17. The article of manufacture according to claim 11, wherein the first coating layers comprise a plurality of alternating germanium sub-layers and metal sub-layers.

18. The article of manufacture according to claim 17, wherein each of the plurality of alternating germanium sub-layers and metal sub-layers has a thickness between 2 microns and 8 microns.

19. The article of manufacture according to claim 17, wherein a thickness of each germanium sub-layer is greater than a thickness of each metal sub-layer.

20. The article of manufacture according to claim 11, wherein a ratio of the germanium constituent to the metal constituent is selected to provide a resulting smooth exterior surface of the article of manufacture.

* * * * *